United States Patent [19]

Morecroft

[11] Patent Number: 5,793,602
[45] Date of Patent: Aug. 11, 1998

[54] LOW IMPEDANCE CAPACITOR

[75] Inventor: Denis Neil Morecroft, Huntingdon, United Kingdom

[73] Assignee: Denis N. Morecroft, Cambridgeshire, United Kingdom

[21] Appl. No.: 693,324

[22] PCT Filed: Feb. 2, 1995

[86] PCT No.: PCT/GB95/00213

§ 371 Date: Aug. 2, 1996

§ 102(e) Date: Aug. 2, 1996

[87] PCT Pub. No.: WO85/03380

PCT Pub. Date: Aug. 1, 1985

[30] Foreign Application Priority Data

Feb. 2, 1994 [GB] United Kingdom ............... 9401965

[51] Int. Cl.⁶ .................................................. H01G 9/00
[52] U.S. Cl. ........................ 361/500; 361/303; 361/503; 361/523
[58] Field of Search .................. 361/301.1, 301.3, 361/301.4, 303, 301.5, 309, 311, 312, 313, 306.3, 306.1, 511, 512, 515, 523, 502, 503, 524, 525, 530, 538; 29/25.03, 25.42

[56] References Cited

U.S. PATENT DOCUMENTS 4,274,124  6/1981  Feinberg et al. ............... 361/275

FOREIGN PATENT DOCUMENTS 853846    11/1960  United Kingdom.
2010582   6/1979   United Kingdom.
2010582   6/1989   United Kingdom.
8503380   8/1985   WIPO.

Primary Examiner—Kristine L. Kincaid
Assistant Examiner—Anthony Dinkins
Attorney, Agent, or Firm—Amster, Rothstein & Ebenstein

[57] ABSTRACT

A capacitor includes two conducting elements for connection to an external circuit. The conducting elements are separated by a dielectric. At least one of the conducting elements has a plurality of electrical connectors through which current will flow. Current and voltage fluctuations are minimized by insuring that incoming and outgoing current flows to or from the conducting element remain substantially separated.

8 Claims, 5 Drawing Sheets

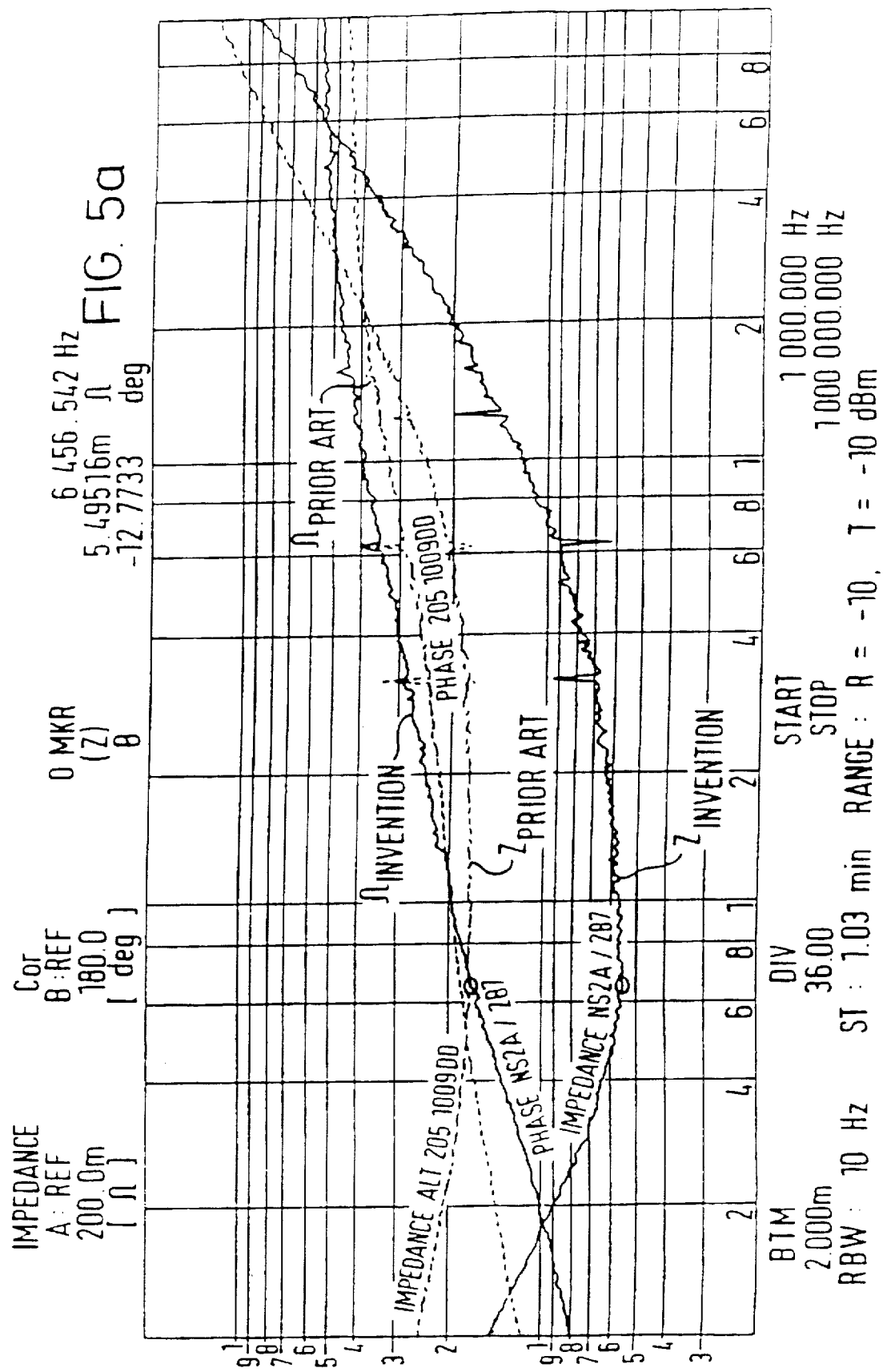

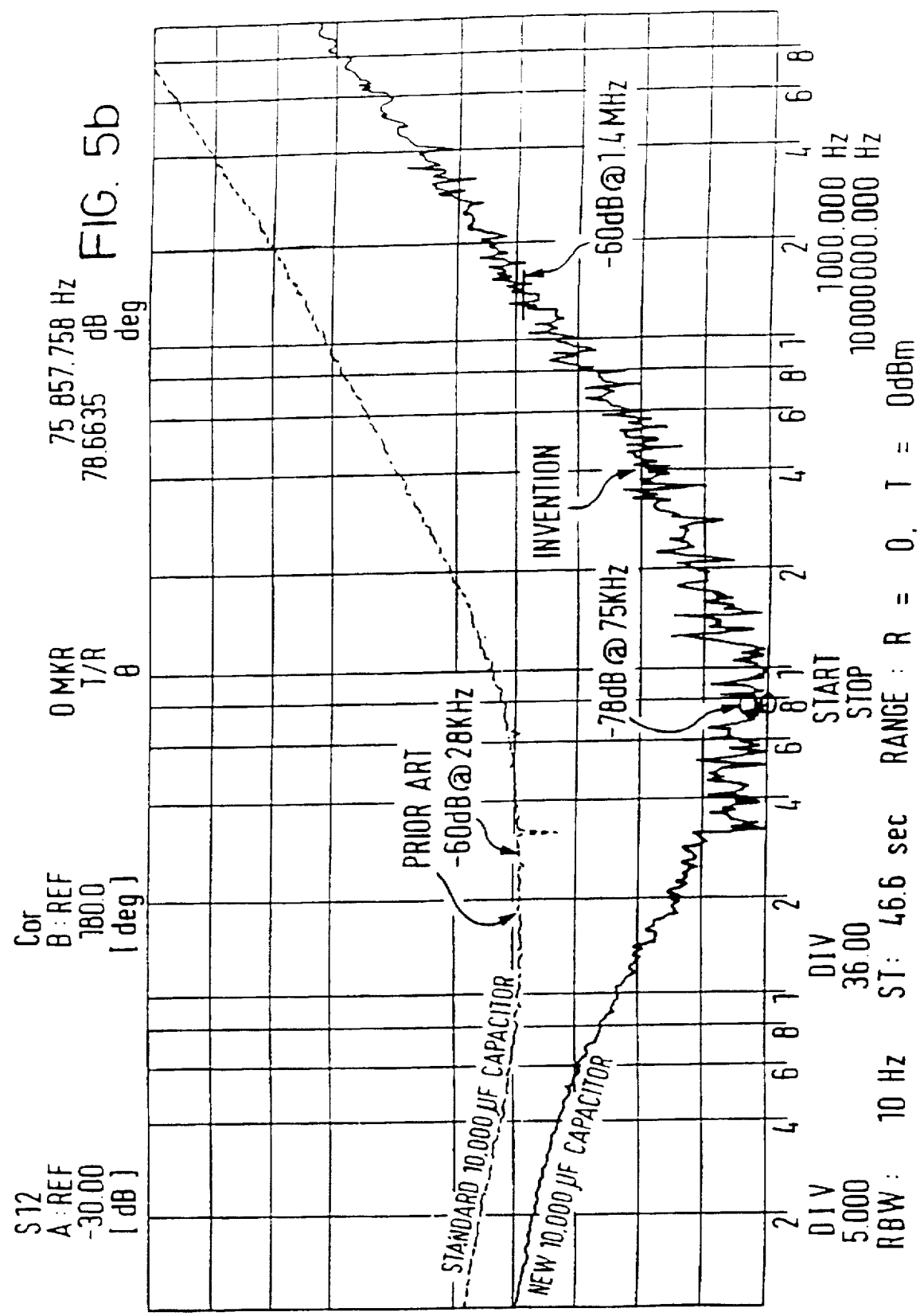

5,793,602

1

LOW IMPEDANCE CAPACITOR

TECHNICAL FIELD

The present invention relates to capacitors.

BACKGROUND OF THE INVENTION

Capacitors are used to store an electric charge and comprise a dielectric insulator which separates a pair of conducting plates.

Conventionally, a wire or a conductor suitable for use with the capacitor is connected between each plate and a respective one of a pair of external terminals. A current necessary to apply the charge to each plate may then be fed to the terminals.

Disadvantageously, the resistance of the conductors and capacitor plates causes a limitation in performance, particularly where the material is chosen, not for its low resistivity but, as in the case of an electrolytic capacitor, for compatibility with the chemical environment of the capacitor.

One common use of a capacitor within a power supply circuit is as a filter to smooth the voltage wave form from a rectifier output. In such an application the capacitor is repeatedly charged and discharged, perhaps many times a second. The charging current is delivered to the plates from the rectifier using the same conductor which delivers the output current to the part of the circuit to be supplied.

Disadvantageously, conductor and capacitor plate imperfections are highlighted in this and other applications, for instance signal and/or power supply decoupling in audio amplifiers, where, perhaps large, incoming currents flow in the same conductor that is supplying current to the circuit being driven. As a result of these imperfections, fluctuations occur in the current and voltage due to the resistance of the conductors and capacitor plates, and these are superimposed on the output to the circuit being driven. This results in a significant degradation of performance.

It is known to provide a capacitor, known as a feedthrough capacitor, for use with high frequency signals in which a pair of connections are made to each plate from respective ones of a pair of external terminals.

SUMMARY OF THE INVENTION

It is an object of the present invention to provide an improved capacitor which overcomes the disadvantages of the above prior art.

According to the present invention there is provided a capacitor, comprising at least two conducting elements for connection to an external circuit, said elements being separated by dielectric means and at least one element having a plurality of electrical connectors through which current will flow, so that incoming and outgoing current flows to/from each said at least one element remain substantially separated and current and voltage fluctuations are minimised.

The connectors may be attached to the at least one element at a common position thereon. Alternatively, the connectors may be connected to the element at separate positions thereon. Advantageously, in order to provide an outgoing current flow virtually completely free of resistive losses, a connector carrying said outgoing current flow may be connected to a respective element intermediate a pair of connectors carrying incoming current flow which conveniently are attached to said element at its opposite ends.

It is envisaged that the above construction may be applied to any form of capacitor although it is particularly suitable

2 for use with electrolytic type capacitors, and inparticular to slit-foil capacitors, where the slits in the foil are arranged to channel the flow of incoming and outgoing current. Such a capacitor is described in U.K. Patent No. 0 169 226.

BRIEF DESCRIPTION OF THE DRAWINGS

In order to aid in understanding the invention specific embodiments thereof will now be described by way of example and with reference to the accompanying drawings in which:

FIGS. 5a and 5b are graphs showing the results of a test comparison between a prior art capacitor and a capacitor of the invention;

DESCRIPTION OF THE PREFERRED EMBODIMENT

Figure 1:
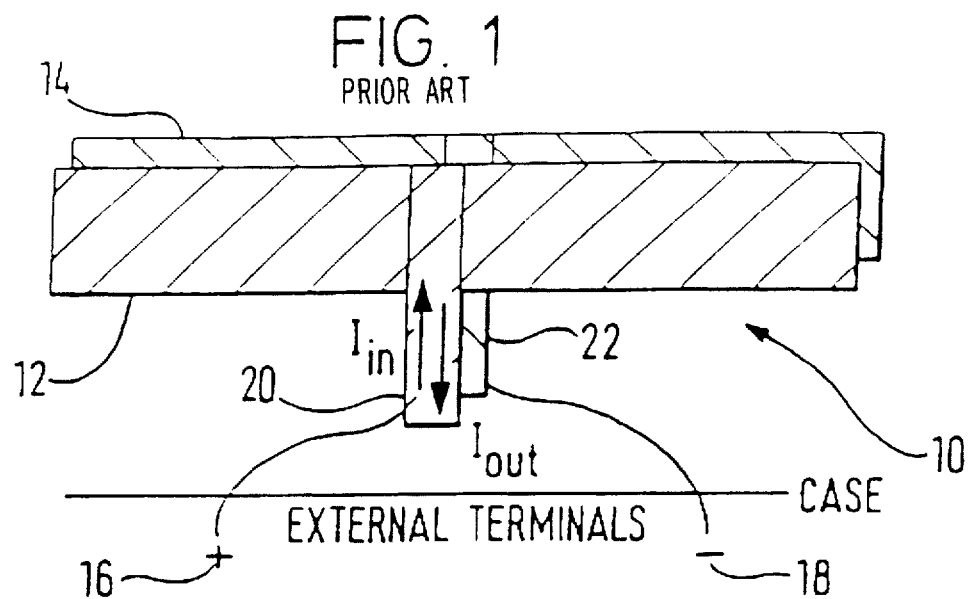
FIG. 1 is a perspective view of a prior art cylindrical electrolytic capacitor, shown unrolled with the dielectric removed for clarity.

The prior art electrolytic capacitor 10 shown in FIG. 1, has a pair of conductive, normally aluminium, plates 12,14 separated by a dielectric (not shown), which are attached to respective positive and negative external terminals 16,18 via a single tab connector 20,22. In use, each tab 20,22 conveys both incoming current from the respective terminal 16,18 as well as outgoing current to the same terminal 16,18, as shown by the arrows $I_{in}$ and $I_{out}$.

Referring to FIG. 5a, this shows both an impedance $Z_{prior\ art}$ and phase $\Omega_{prior\ art}$ curve plotted for a typical prior art electrolytic capacitor for a frequency range of from 1 kHz to 1 MHz from which it can be seen that the impedance of the capacitor initially decreases with increasing frequency to a minimum value at around 6.5 kHz, of about 17 m$\Omega$, at which point inductance within the capacitor causes the impedance to rise with further increasing frequency.

Figure 2:
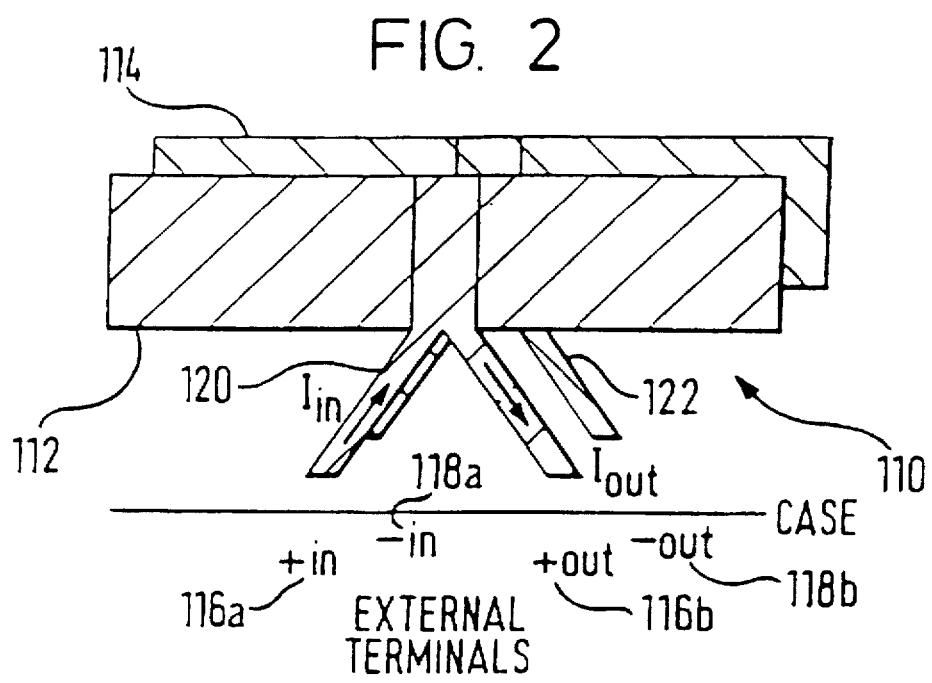
FIG. 2 is a similar view of a capacitor according to the invention.

FIG. 2 shows a capacitor 110 of the present invention in which each plate 112,114 is attached to respective pairs of positive and negative external terminals 116a,116b, and 118a,118b, such that a separate terminal is provided for the input and output of current to each the plates 112,114 in respect of both polarities. Bifurcated tabs 120,122 provide the connection between the respective terminals 116a,116b, and 118a,118b and an intermediate position on the corresponding plate 112,114. In use, the bifurcated portions of each tab 120,122 ensure that the incoming and outgoing currents shown by the arrows $I_{in}$ and $I_{out}$ are conveyed separately between the plates 112,114 and the terminals 116a,116b, and 118a,118b.

Figure 3:
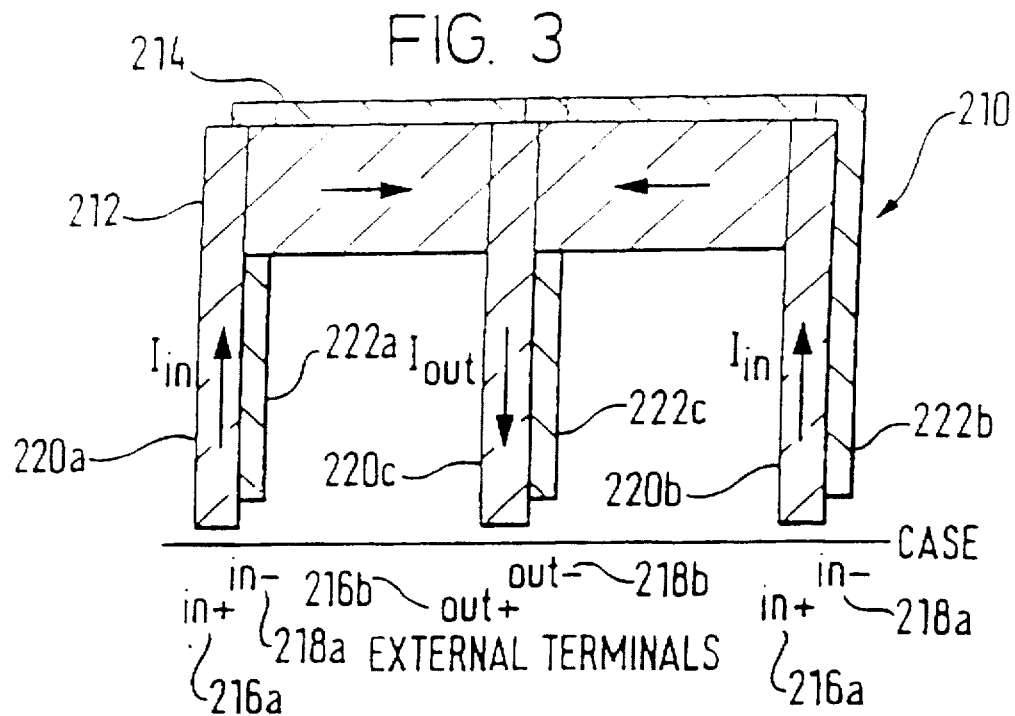
FIG. 3 is a similar view of a variant of the capacitor of FIG. 2.

FIG. 3, shows a variant 210 of the capacitor of FIG. 2, in which tabs 220a,220b,220c and 222a,222b,222c provide connections between respective plates 212,214 and terminals 216a,216b, and 218a,218b. The tabs 220a,220b and 222a,222b convey, in use, incoming current shown by the arrow $I_{in}$, to a respective plate 212,214 at opposite ends thereof. Outgoing current shown by the arrow $I_{out}$ is conveyed from the mid-point of each plate by the tab 220c,222c. In this way, the charging displacement currents within the dielectric (not shown) would be moving in opposite directions and the resistive losses caused by said currents would not be seen from each output terminal 216b,218b.

Again, referring to FIG. 5a, this shows both an impedance $Z_{invention}$ and phase $\Omega_{invention}$ curve plotted for an electrolytic capacitor of the present invention having the arrangement shown in FIG. 3, for a frequency range of from 1 kHz to 1 MHZ. From the curve, it will be noted by one skilled in the art that the capacitor of the invention has a much improved performance in comparison to an otherwise equivalent prior art capacitor of the same capacitance and construction. That is, the impedance is reduced in comparison to the conventional capacitor at all frequencies within the range and the impedance remains below the best level reached by the conventional capacitor to a much higher frequency. In particularly the minimum impedance level reached at about 6.5 kHz is around 5.5 mΩ.

FIG. 5b, shows a comparison of the transfer functions of the capacitors whose results are plotted in FIG. 5a, from which it can be seen from the amplitude curve that the minimum achieved by the prior art capacitor (broken line) is −60 dB at 28 kHz, whilst for the present invention (full line) the response is improved over the entire frequency range reaching a minimum of −78 dB at 75 kHz. Furthermore the curve of the present invention does not rise above the lowest level reached by the prior art curve until a frequency of around 1.4 MHz, a fifty-fold improvement in frequency range over the prior art. Such improvements in the performance of the present capacitor would be expected to be even greater at higher values of capacitance.

In a further, non-illustrated variant of the present capacitor, multiple tabs could be utilised to feed outgoing current to a plurality of output terminals and circuits having different power requirements.

the supply and a centre tapped secondary 56. The e.m.f. induced in each section of the secondary 56 is equal in magnitude and is applied to a conventional diode bridge 60, whilst the centre tap 58 is connected directly to negative and positive plates 414,412' respectively of first and second four-terminal capacitors 410,410'. The output from the bridge 60 is fed in each case via a current limiting resistor 70,70' to, respectively, the positive and negative plates 412,414' of said first and second capacitors 410,410' via dedicated connections 408,408'. A separate conductor 420 carries the positive output from the positive plate 412 of the first capacitor 410 whilst a separate conductor 420' carries the negative output from the negative plate 414' of the second capacitor 410'. A zero voltage line 422 is connected directly from the negative and positive plates 414,412' of said first and second capacitors 410,410'.

Theoretically at least, the current limiting resistors 70,70' should reduce the peak charging current in the above circuit 50 by a factor of at least ten and should therefore reduce the stress on all parts of the circuit 50. In the conventional circuit (not shown) where the four-terminal capacitors 410,410' are replaced by conventional capacitors these peak currents mix with the relatively steady outgoing current feed to the load which could be, for example, an audio amplifier. This mixing results in poor performance which may well be audible. In the present circuit 50, the separate current pathways provided to the plates of the capacitors 410,410' for incoming and outgoing current effectively eliminate any mixing. Consequently, it should be possible to increase the size of the capacitors used to between 50,000 μF and 500,000 μF, and reduce the transformer current capacity required to the average power rather than the peak power. Such a supply would behave much more like an ideal battery power supply.

Figure 6:
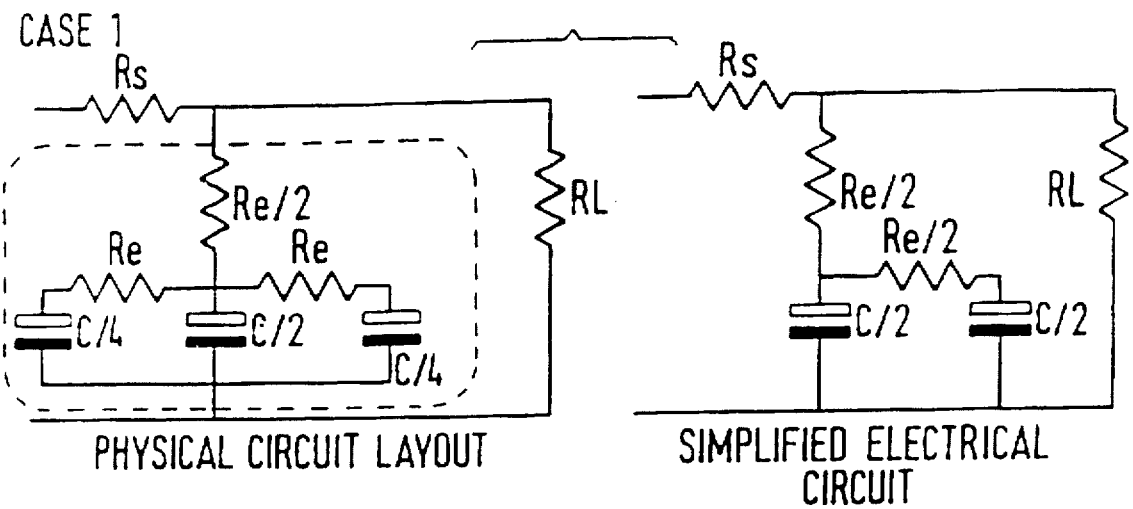
FIG. 6 is a circuit diagram employing a conventional capacitor for use in obtaining the transfer function of the circuit.
Figure 7:
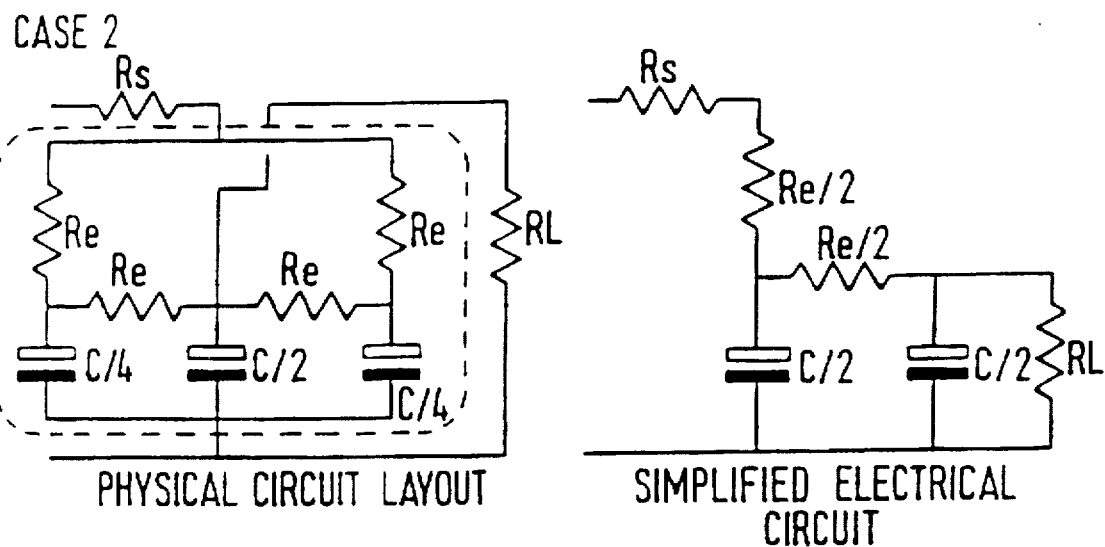
FIG. 7 is a circuit diagram employing the capacitor of the invention for use in obtaining the transfer function of the circuit.

With reference to FIGS. 6 and 7, there follows a mathematical analysis of the behaviour of a source having resistance $R_S$ supplying current to a load resistance $R_L$ in parallel with, for Case 1, a conventional capacitor as illustrated in FIG. 6 and for Case 2, a capacitor according to the invention as illustrated in FIG. 7. The capacitor in each case has a resistance $R_e$ and a capacitance C.

Case 1

$$Zx(s) := Re + \frac{4}{s \cdot C} \qquad Yc(s) := s \cdot \frac{C}{2} + \frac{2}{Zx(s)}$$

$$Zc(s) := \frac{Re}{2} + \frac{1}{Yc(s)} \qquad \text{Impedance of capacitor}$$

$$V1(s) := \frac{1}{Rs \cdot \left(\frac{1}{Zc(s)} + \frac{1}{RL}\right) + 1} \qquad \text{Transfer function of equivalent circuit}$$

Case 2

$$YL(s) := s \cdot \frac{C}{2} + \frac{1}{RL} \qquad Ys(s) := s \cdot \frac{C}{2} + \frac{YL(s)}{\frac{Re}{2} \cdot YL(s) + 1} \qquad \text{Input admittance}$$

$$\beta(s) := \frac{1}{\frac{Re}{2} \cdot YL(s) + 1} \qquad \alpha(s) := \frac{1}{\left(Rs + \frac{Re}{2}\right) \cdot Ys(s) + 1}$$

$$V2(s) := \alpha(s) \cdot \beta(s) \qquad \text{Transfer function of equivalent circuit}$$

Figure 4:
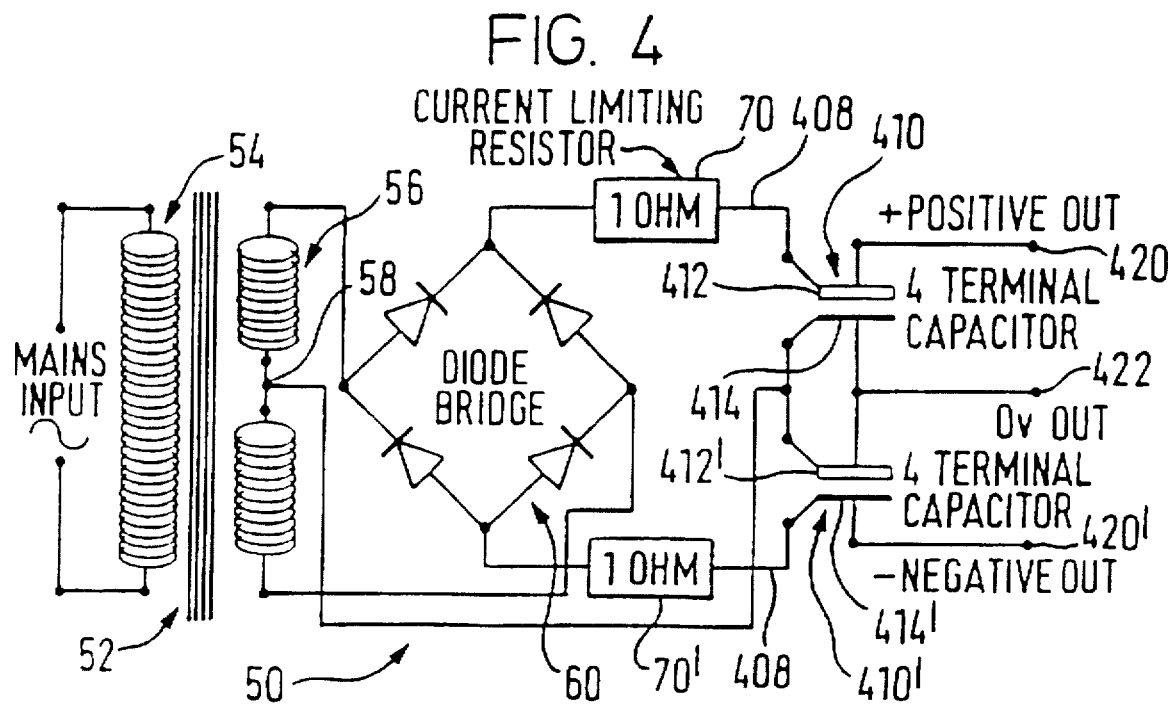
FIG. 4 is a circuit diagram illustrating a circuit utilizing the capacitor of FIG. 2.

Turning to FIG. 4, this shows a typical D.C. output power supply 50 for operation from the A.C. mains supply. A step down transformer 52 comprises a primary 54 connected to By substituting the following values, namely $R_e$=0.1 Ω, C=5000 μF, $R_s$=1 Ω, and $R_L$=10 Ω, into the derived formulae we obtain $$V1 = \cfrac{1}{Rs \cdot \left[\cfrac{1}{\cfrac{Re}{2} + \cfrac{1}{s \cdot \cfrac{C}{2} + \cfrac{2}{Re + \cfrac{4}{s \cdot C}}}} + \cfrac{1}{RL}\right] + 1}$$

$$\cfrac{RL \cdot (s^2 \cdot C^2 \cdot Re^2 + 12 \cdot s \cdot C \cdot Re + 16)}{Re \cdot C^2 \cdot (2 \cdot Rs \cdot RL + RL \cdot Re + Rs \cdot Re) \cdot s^2 + 4 \cdot C \cdot (4 \cdot Rs \cdot RL + 3 \cdot RL \cdot Re + 3 \cdot Rs \cdot Re) \cdot s + 16 \cdot (Rs + RL)}$$

$$s^2 \cdot C^2 \cdot Re^2 + 12 \cdot s \cdot C \cdot Re + 16$$

$$\begin{bmatrix} -2 \cdot (3 - \sqrt{5}) \\ -2 \cdot (3 + \sqrt{5}) \end{bmatrix} = \begin{pmatrix} -1.528 \\ -10.472 \end{pmatrix} \quad -\cfrac{1}{2 \cdot \pi} \begin{bmatrix} -2 \cdot \cfrac{3 - \sqrt{5}}{C \cdot Re} \\ -2 \cdot \cfrac{3 + \sqrt{5}}{C \cdot Re} \end{bmatrix} = \begin{pmatrix} 486.334 \\ 3333.384 \end{pmatrix} \cdot Hz$$

$$\cfrac{Re \cdot C^2 \cdot (2 \cdot Rs \cdot RL + RL \cdot Re + Rs \cdot Re) \cdot s^2 + 4 \cdot C \cdot (4 \cdot Rs \cdot RL + 3 \cdot RL \cdot Re + 3 \cdot Rs \cdot Re) \cdot s + 16 \cdot (Rs + RL)}{16 \cdot RL}$$

$$a1 := Re \cdot \left(\cfrac{C}{4}\right)^2 \cdot \left(2 \cdot Rs + Re + \cfrac{Rs \cdot Re}{RL}\right) \quad a1 = 3.297 \cdot 10^{-7} \cdot sec^2$$

$$b1 := \cfrac{C}{4} \cdot \left(4 \cdot Rs + 3 \cdot Re + \cfrac{3 \cdot Rs \cdot Re}{RL}\right) \quad b1 = 0.005 \cdot sec$$

$$c1 := \cfrac{Rs}{RL} + 1 \quad c1 = 1.1$$

$$p1 := -\cfrac{1}{2 \cdot \pi} \cdot \cfrac{-b1 + \sqrt{b1^2 - 4 \cdot a1 \cdot c1}}{2 \cdot a1} \quad p1 = 32.756 \cdot Hz$$

$$p2 := -\cfrac{1}{2 \cdot \pi} \cdot \cfrac{-b1 - \sqrt{b1^2 - 4 \cdot a1 \cdot c1}}{2 \cdot a1} \quad p2 = 2580.1 \cdot Hz$$

$$Y2 = \cfrac{1}{\left(Rs + \cfrac{Re}{2}\right) \cdot \left(s \cdot \cfrac{C}{2} + \cfrac{YL}{\cfrac{Re}{2} \cdot YL + 1}\right) + 1} \cdot \cfrac{1}{\cfrac{Re}{2} \cdot YL + 1}$$

$$\cfrac{1}{\left[\left[\left(Rs + \cfrac{1}{2} \cdot Re\right) \cdot \left[\cfrac{1}{2} \cdot s \cdot C + \cfrac{\left(\cfrac{1}{2} \cdot s \cdot C + \cfrac{1}{RL}\right)}{\left[\cfrac{1}{2} \cdot Re \cdot \left(\cfrac{1}{2} \cdot s \cdot C + \cfrac{1}{RL}\right) + 1\right]}\right]\right] + 1\right] \cdot \left[\cfrac{1}{2} \cdot Re \cdot \left(\cfrac{1}{2} \cdot s \cdot C + \cfrac{1}{RL}\right) + 1\right]}$$

$$\cfrac{16 \cdot RL}{Re \cdot RL \cdot C^2 \cdot (2 \cdot Rs + Re) \cdot s^2 + 2 \cdot C \cdot (8 \cdot Rs \cdot RL + 2 \cdot Rs \cdot Re + Re^2 + 6 \cdot Re \cdot RL) \cdot s + 16 \cdot (Rs + Re + RL)}$$

$$a2 := \cfrac{Re \cdot C^2 \cdot RL \cdot (2 \cdot Rs + Re)}{16 \cdot RL} \quad a2 = 3.281 \cdot 10^{-7} \cdot sec^2$$

$$b2 := \cfrac{2 \cdot C \cdot (2 \cdot Rs \cdot Re + 8 \cdot Rs \cdot RL + Re^2 + 6 \cdot RL \cdot Re)}{16 \cdot RL} \quad b2 = 0.005 \cdot sec$$

$$c2 := \cfrac{RL + Rs + Re}{RL} \quad c2 = 1.11$$

$$p1 := -\cfrac{1}{2 \cdot \pi} \cdot \cfrac{-b2 + \sqrt{b2^2 - 4 \cdot a2 \cdot c2}}{2 \cdot a2} \quad p1 = 33.209 \cdot Hz$$

$$p1 := -\cfrac{1}{2 \cdot \pi} \cdot \cfrac{-b2 - \sqrt{b2^2 - 4 \cdot a2 \cdot c2}}{2 \cdot a2} \quad p2 = 2580.1 \cdot Hz$$

$$i := 0 \ldots 40 \quad f_i := 10^{0.1 \cdot i} \cdot Hz \quad s := 2j \cdot \pi \cdot f$$

which are the transfer functions for each Case which can be plotted in a manner similar to FIG. 5b to show the improved response of the capacitor of the invention.

I claim:

1. A capacitor, comprising at least two conducting elements for connection to an external circuit, said elements being separated by dielectric means, at least one of said elements having at least three discrete connectors at predetermined and separated positions on said one element and forming independent connections to said external circuit, wherein during use when said capacitor is connected in said circuit, at least one of said connectors exclusively carries current flow in one direction at a time, the remaining connectors exclusively carrying current in an opposite direction at said time to thereby define a direction for flow of plate current in said one element.

2. A capacitor as claimed in claim 1, wherein a connector of said at least three discrete connectors carries outgoing current flow and is connected to the at least one element intermediate a pair of connectors of said at least three discrete connectors, each of said pair carrying incoming current flow.

3. A capacitor as claimed in claim 1, wherein said at least three discrete connectors are attached to the at least one element at opposite ends thereof.

4. A capacitor as claimed in claim 1, wherein the capacitor is of the electrolytic type.

5. A capacitor as claimed in claim 1, wherein the at least one element is provided with slits.

6. A capacitor as claimed in claim 5, wherein the slits in the at least one element are arranged to channel the flow of current between said at least three discrete connectors.

7. A capacitor as claimed in claim 2, having a minimum impedance less than 17 m$\Omega$ at 6.5 kHz.

8. A capacitor as claimed in claim 2, having a minimum impedance of about 5.5 m$\Omega$ at 6.5 kHz.

* * * * *